(12) United States Patent  (10) Patent No.: US 9,317,049 B2
Guo  (45) Date of Patent: Apr. 19, 2016

(54) EMULATED CURRENT RAMP FOR DC-DC CONVERTER

(71) Applicant: Texas Instruments Incorporated, Dallas, TX (US)

(72) Inventor: Song Guo, Macomb, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 469 days.

(21) Appl. No.: 13/774,496

(22) Filed: Feb. 22, 2013

(65) Prior Publication Data

US 2014/0239924 A1  Aug. 28, 2014

(51) Int. Cl.
*G05F 1/46* (2006.01)
*H02M 1/00* (2007.01)
*H02M 3/156* (2006.01)

(52) U.S. Cl.
CPC . *G05F 1/46* (2013.01); *H02M 1/00* (2013.01); *H02M 3/156* (2013.01)

(58) Field of Classification Search
CPC .................. H02M 2001/0009; H02M 3/156; H02M 3/158; H02M 3/1588
USPC ................... 323/271, 282, 285, 288
See application file for complete search history.

(56) References Cited

U.S. PATENT DOCUMENTS

| | | | | |
|---|---|---|---|---|
| 6,057,675 A | * | 5/2000 | Tateishi | H02M 3/1588 323/225 |
| 7,109,692 B1 | * | 9/2006 | Wu | H02M 1/44 323/282 |
| 7,202,609 B2 | | 4/2007 | Langeslag et al. | |
| 7,595,624 B2 | | 9/2009 | Tateishi et al. | |
| 7,710,084 B1 | * | 5/2010 | Guo | 323/224 |
| 7,816,896 B2 | * | 10/2010 | Lipcsei | H02M 1/36 323/271 |
| 8,570,019 B2 | * | 10/2013 | Nakamura | 323/284 |
| 8,766,617 B2 | * | 7/2014 | Wan et al. | 323/285 |
| 2014/0210443 A1 | * | 7/2014 | Liu | H02M 3/1588 323/282 |

OTHER PUBLICATIONS

Zhang et al., "D-CAP(TM) Mode With All-Ceramic Output Capacitor Application," Texas Instruments Inc. Application Report SLVA453 (Feb. 2011).

* cited by examiner

*Primary Examiner* — Timothy J Dole
*Assistant Examiner* — Htet Z Kyaw
(74) *Attorney, Agent, or Firm* — Willaim B. Kempler; Frank D. Cimino

(57) ABSTRACT

A voltage converter (FIG. 4) for a power supply circuit is disclosed. The voltage converter comprises a control circuit (400) coupled to receive an enable (EN) signal. The control circuit produces a first control signal (PWM) to provide a load current ($I_L$) in response to the enable signal. A sample and hold circuit (408) is arranged to produce a third control signal (CSP) to emulate the load current and a fourth control signal (CSN') to sample and hold value of the third control signal. A comparator circuit (416) is arranged to compare the third and fourth control signals and produce the enable signal in response to a result of the comparison.

20 Claims, 7 Drawing Sheets

EMULATED CURRENT RAMP FOR DC-DC CONVERTER

BACKGROUND OF THE INVENTION

Embodiments of the present invention relate to closed loop voltage control with adaptive on time control schemes. A preferred embodiment of the invention is intended for use in a DC-DC switching regulator circuit, but the circuit may also be used in other applications that require closed loop voltage regulation.

Referring to FIGS. 1 and 2A, there is a DC-DC switching regulator circuit of the prior art as disclosed by Tateishi et al. in U.S. Pat. No. 7,595,624. The switching regulator includes a pulse-width modulation (PWM) controller 52 configured to alternately activate 10 a high-side transistor 54 and a low-side transistor 56 as shown at FIG. 1. The PWM controller 52 controls the duty cycle of pulses provided to both transistors 54 and 56. Transistor 54 has a drain terminal that is connected to a supply voltage source $V_{DD}$. Transistor 56 has a source terminal connected to ground. Transistors 54 and 56 have a common terminal that produces switching voltage $V_{SW}$. An inductor 60 is interconnected between the common terminal and an output terminal producing a voltage $V_{OUT}$. A freewheeling diode 62 is interconnected between one terminal of inductor 60 and ground.

During an on-time, controller 52 activates transistor 54 while transistor 56 remains inactive. When transistor 54 is on, voltage $V_{SW}$ increases to approximately $V_{DD}$. Consequently, current through inductor 60 increases. During an off-time, the controller 52 deactivates transistor 54 and activates transistor 56. Consequently, voltage $V_{SW}$ decreases to approximately ground. Current through inductor 60, however, tends to remain unchanged. Thus, the voltage $V_{SW}$ becomes negative relative to ground so that inductor current is supplied through the freewheeling diode 62. Accordingly, the switching regulator operates to maintain the current flow through inductor 60, thus providing an output voltage $V_{OUT}$ across a load capacitor 64 and a load resistor 66.

The switching regulator also includes a PWM comparison circuit 68-1 to determine the off-time relative and the on-time of transistor 54. The output voltage $V_{OUT}$ is applied to the PWM comparison circuit through a voltage divider 70 that includes resistors $R_1$ and $R_2$. The voltage divider provides a feedback voltage $V_{FB}$ as an output. The PWM comparison circuit includes a ramp signal generator 72-1 configured to generate a ramp signal, preferably by alternately charging or discharging a capacitor. The feedback voltage $V_{FB}$ and the ramp signal are added together by adder 74-1. A resultant modified feedback voltage $V_{FB2}$ is provided to a comparator or error amplifier 76, which compares the modified feedback voltage $V_{FB2}$ and the reference voltage $V_{REF}$. The comparator 76 thus provides an output to the PWM controller 52 to switch between the on-time and the off-time. In this manner, on-time ($T_{ON}$) is approximately equal to the switching time ($T_{SW}=T_{ON}+T_{OFF}$) multiplied by $V_{OUT}/V_{DD}$, where the switching regulator frequency is equal to $1/T_{SW}$.

As the operating frequency of the switching regulator circuit of FIG. 2A increases, several problems limit circuit efficiency. Due to noise or other effects, reference voltage $V_{REF}$ can be subject to error such that output voltage $V_{OUT}$ is compared to $V_{REF}$, thereby producing error voltage $V_E$ as shown at FIG. 2A. This error voltage produces a next on-time error $T_0$ and a premature output ripple voltage 12. Tateishi et al. disclose an improvement as shown at FIG. 2B. There, the maximum feedback voltage $V_{FB}$ is added to reference voltage $V_R$ to produce modified feedback voltage $V_{FB2}$. The relatively steeper slope of $V_{FB2}$ decreases the uncertainty on-time from $T_{UNC1}$ to $T_{UNC2}$.

The circuit of FIG. 2A was subsequently improved with the addition of the current sense circuit of FIG. 3A connected in parallel with inductor 60 as disclosed by Texas Instruments Inc., Application Report SLVA453-February 2011. The current sense circuit includes series-connected resistor 300 and capacitor 302 in parallel with inductor 60 and produces positive current sense signal CSP. Series-connected resistor 304 and capacitor 306 are connected in parallel with capacitor 302 and produce negative current sense signal CSN.

Referring now to FIG. 3B, there is a timing diagram showing operation of the current sense circuit of FIG. 3A in continuous current mode (CCM). Here, CCM means that either transistor 54 or 56 (FIG. 2A) is always on. At time t1 transistor 54 is activated and voltage $V_{SW}$ goes high. Responsively, voltage CSP emulates the inductor current $I_L$ until transistor 54 is turned off and transistor 56 is turned on. At time t2, CSP again emulates inductor current $I_L$ and goes low to a valley at time t3. CSN, however, has an intermediate value between the peak and valley of CSP.

Referring next to FIG. 3C, there is a timing diagram showing operation of the current sense circuit of FIG. 3A in discontinuous current mode (DCM). Here, DCM means that either transistor 54 or 56 (FIG. 2A) is on or both are off. At time t1 transistor 54 is activated and voltage $V_{SW}$ goes high. Voltage CSP again emulates the inductor current $I_L$ until transistor 54 is turned off and transistor 56 is turned on. At time t2, CSP again emulates inductor current $I_L$ and decreases until time t3 when transistor 56 is turned off. Between times t3 and t4, both transistors 54 and 56 are off, inductor current IL is zero, and CSP and CSN vary as capacitors 302 and 306 discharge. The offset of CSN in CCM and DCM, is not constant and is, therefore, difficult to cancel when compared to CSP. Various embodiments of the present invention are directed to solving these problems and improving operation of the switching regulator.

BRIEF SUMMARY OF THE INVENTION

In a preferred embodiment of the present invention, a voltage converter for a power supply is disclosed. The voltage converter includes a control circuit coupled to receive an enable signal. The control circuit produces a first control signal to provide a load current in response to the enable signal. A sample and hold circuit is arranged to produce a third control signal to emulate the load current and a fourth control signal to sample and hold a value of the third control signal. A comparator circuit is arranged to compare the third and fourth control signals and produce the enable signal in response to a result of the comparison.

DETAILED DESCRIPTION OF THE INVENTION

The preferred embodiments of the present invention provide significant advantages over DC-DC voltage converters of the prior art as will become evident from the following detailed description.

Figure 1:
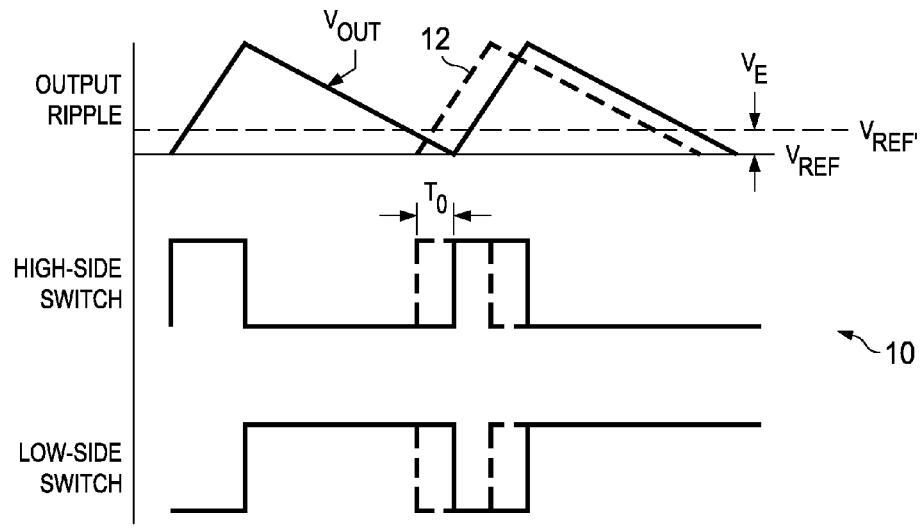
FIG. 1 is a timing diagram showing operation of the DC-DC voltage regulator circuit of FIG. 2A.
Figure 2A:
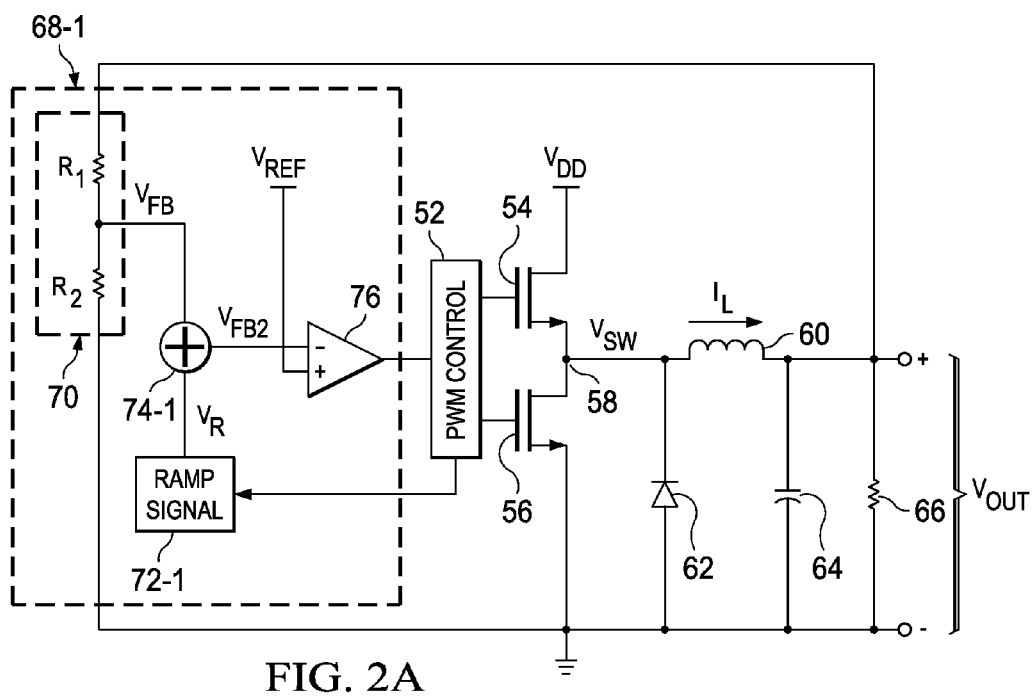
FIG. 2A is a DC-DC voltage regulator circuit of the prior art.
Figure 2B:
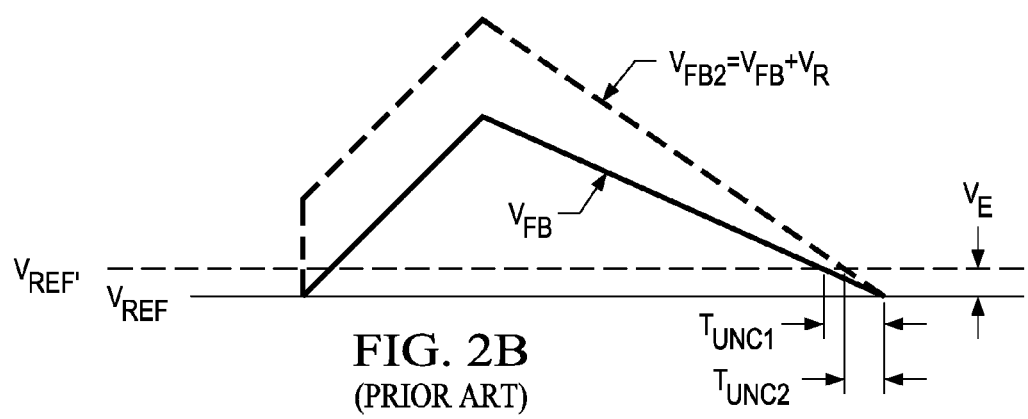
FIG. 2B timing diagram showing an improvement of the circuit of FIG. 2A.
Figure 3A:
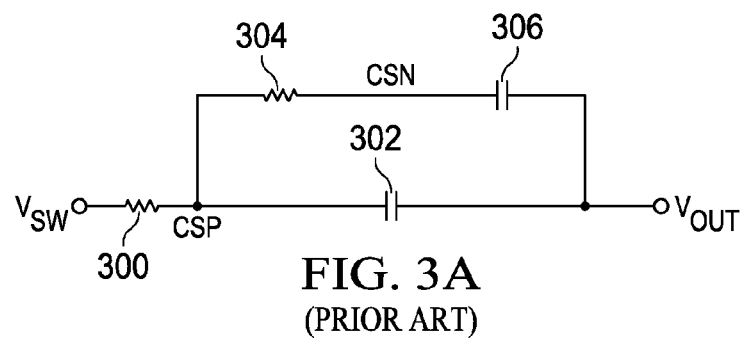
FIG. 3A is a current sense circuit of the prior art added as an improvement to the circuit of FIG. 2A.
Figure 3B:
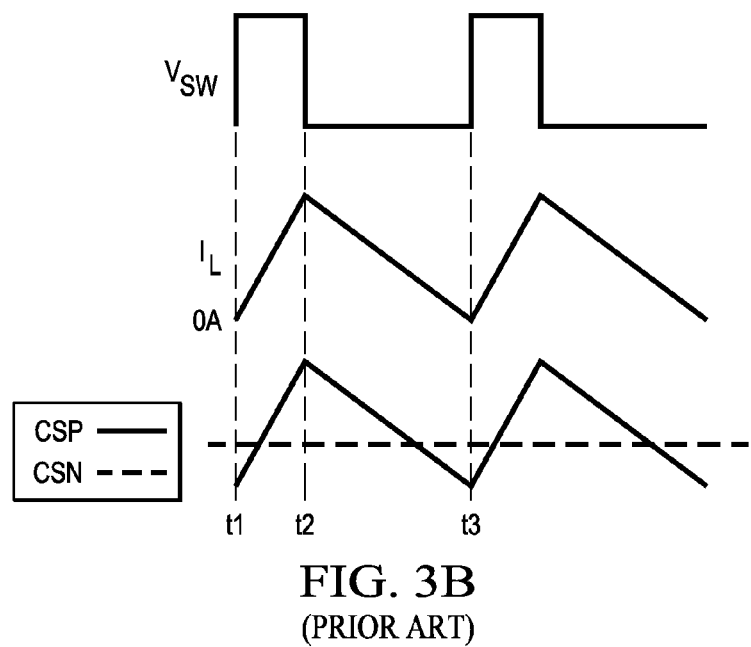
FIGS. 3B and 3C are timing diagrams showing operation of the circuit of FIG. 3A in continuous current mode (CCM) and discontinuous current mode (DCM), respectively.
Figure 3C:
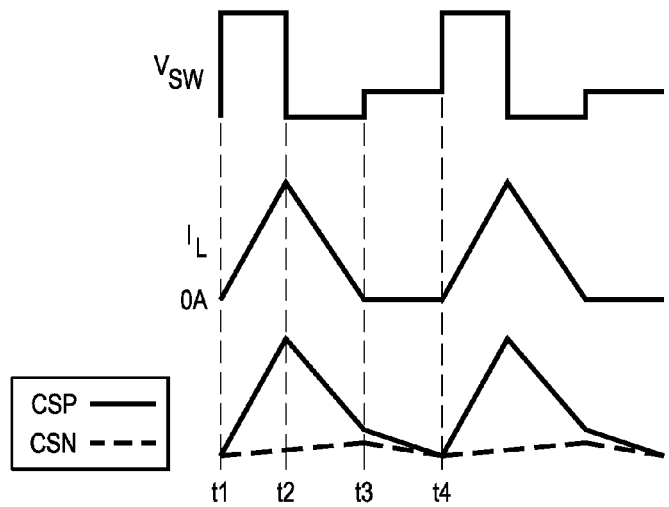
Figure 4:
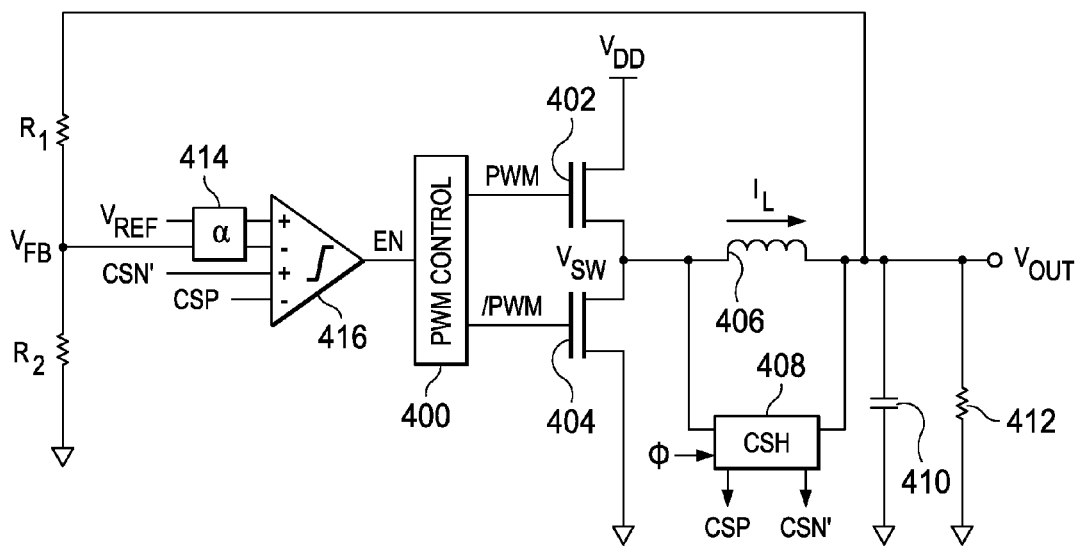
FIG. 4 is a DC-DC voltage regulator circuit of the present invention.

Referring to FIG. 4, there is a DC-DC voltage regulator circuit of the present invention. Here and in the following discussion, the same reference numerals are used in various drawing figures to indicate the same circuit elements. The voltage regulator includes a pulse width modulation (PWM) control circuit 400 that produces control signal PWM and complementary control signal /PWM. In some embodiments of the present invention, complementary control signal /PWM may be omitted. N-channel transistor 402 has a current path coupled between supply voltage $V_{DD}$ and voltage terminal $V_{SW}$ controlled by PWM. N-channel transistor 404 has a current path coupled between voltage terminal $V_{SW}$ and reference supply voltage terminal $V_{SS}$. The current path of n-channel transistor 404 is controlled by /PWM. Inductor 406 is coupled between voltage terminal $V_{SW}$ and output terminal $V_{OUT}$ to supply load current $I_L$ to load capacitance 410 and load resistance 412. A current sample and hold circuit 408 is coupled in parallel with inductor 406 and produces control signals CSP and CSN' as will be explained in detail.

Output voltage $V_{OUT}$ is fed back to a voltage divider formed by resistors $R_1$ and $R_2$ to produce feedback voltage $V_{FB}$ at their common terminal. Feedback voltage $V_{FB}$ is compared with reference voltage $V_{REF}$ and CSP is compared with CSN' by comparator circuit 416 to produce enable signal EN. The comparison of $V_{FB}$ with $V_{REF}$ has a gain factor α (414) relative to the comparison of CSP and CSN'. In a preferred embodiment of the present invention, gain factor α has a value of 4 as determined by relative conductivity of comparator transistors.

Figure 5A:
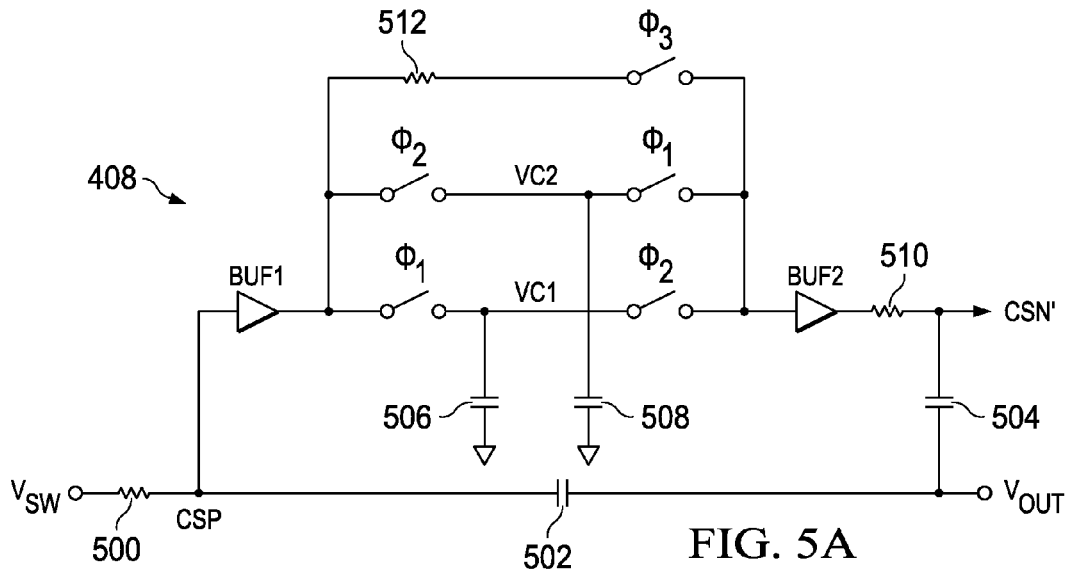
FIG. 5A is a current sample and hold (CSH) circuit of the present invention.

Turning now to FIG. 5A, current sample and hold circuit 408 will be described in detail. Resistor 500 and capacitor 502 are connected in series between voltage terminal $V_{SW}$ and output terminal $V_{OUT}$ to form an RC filter. Control signal CSP emulates the current through inductor 406. Here, emulate means minimum and maximum values of CSP occur at substantially the same time as minimum and maximum values of $I_L$, respectively. Moreover, CSP increases as $I_L$ increases. A first buffer (BUF1) applies CSP to resistor 512 and to switches controlled by clock signals $\phi_1$ and $\phi_2$. Here and in the following discussion, switches are used by way of explanation. In preferred embodiments of the present invention these switches may be bipolar transistors, MOS transistors, CMOS transmission gates, or other devices that are well known in the art. A switch controlled by clock signal $\phi_3$ selectively connects resistor 512 to the input terminal of a second buffer (BUF2). Capacitor 506 is coupled to receive and store buffered signal CSP (VC1) when the switch controlled by clock signal $\phi_1$ is closed. Likewise, capacitor 508 is coupled to receive and store buffered signal CSP (VC2) when the switch controlled by clock signal $\phi_2$ is closed. Clock signals $\phi_1$ and $\phi_2$ are alternately activated to apply one of VC1 and VC2 to the input terminal of buffer BUF2 when $\phi_2$ and $\phi_1$ are activated, respectively. Buffer BUF2 applies the respective sampled CSP (VC1 or VC2) to capacitor 504 via resistor 510 where it is stored as CSN'.

Figure 5B:
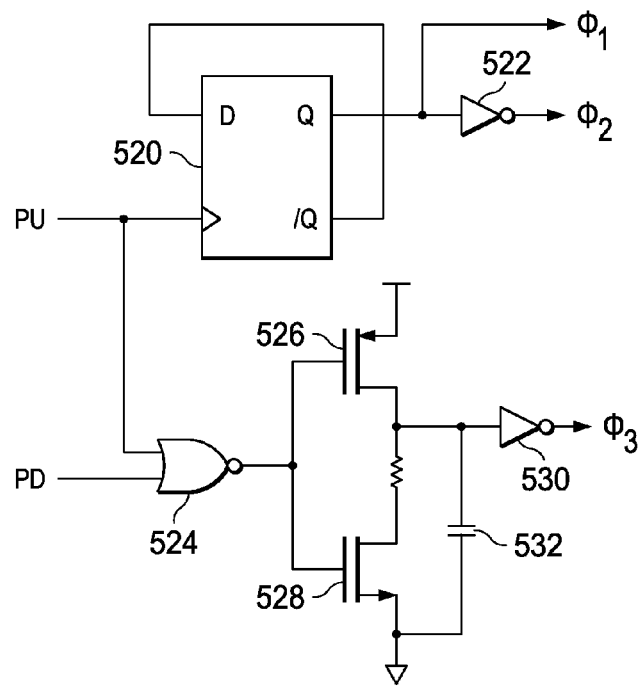
FIG. 5B is a clock generator circuit for the current sample and hold circuit of FIG. 5A.

Referring now to FIG. 5B, operation of the circuit to generate clock signals $\phi_1$, $\phi_2$, and $\phi_3$ for the circuit of FIG. 5A will be described in detail. Pull up (PU) and pull down (PD) control signals are generated by the PWM control circuit of FIG. 7 and correspond to control signals PWM and /PWM as will be described in detail. Delay flip flop 520 is coupled to receive control signal PU at a clock terminal and produces a high level of clock signal $\phi_1$ at a first time. Inverter 522 responsively produces a complementary low level of clock signal $\phi_2$ at the first time. The complementary output (/Q) of delay flip flop 520 is coupled to input terminal D so that a next high level of control signal PU at the clock terminal and produces a low level of clock signal $\phi_1$ at a second time. Inverter 522 responsively produces a complementary high level of clock signal $\phi_2$ at the second time.

In a discontinuous operating mode (DCM), control signals PU and PD are both low at the same time. NOR gate 524 produces a high level signal at the input of a delay inverter formed by p-channel transistor 526, n-channel transistor 528, and an intermediate resistor. The output of the delay inverter is coupled to capacitor 532 to provide an RC output delay. Inverter 530 is coupled to receive the output signal from the delay inverter and produce a high level of clock signal $\phi_3$ while PU and PD are both low. The delay inverter and RC elements are preferably designed to provide adequate time for PU and PD to settle so that CSP and CSN' are approximately equal.

Figure 5D:
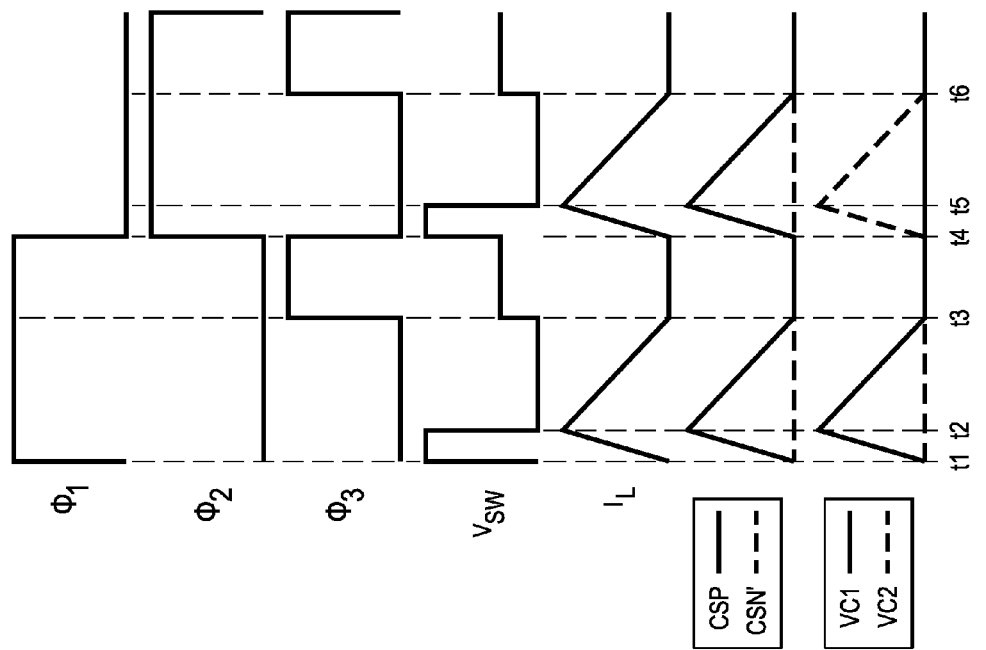
FIGS. 5C and 5D are timing diagrams showing operation of the circuit of FIG. 4 in continuous current mode (CCM) and discontinuous current mode (DCM), respectively.
Figure 5C:
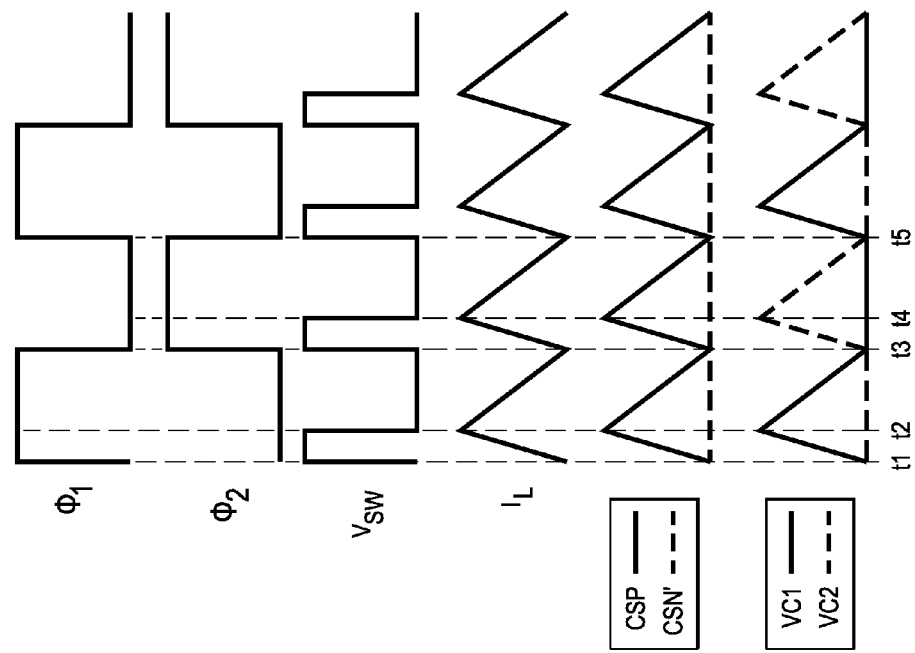

Turning now to FIG. 5C, continuous current mode (CCM) of the circuits of FIGS. 5A and 5B will be described in detail. At time t1, signal $V_{SW}$ (FIG. 4) goes high in response to control signal PU and corresponding signal PWM. Inductor current $I_L$ increases to a peak value at time t2 while $V_{SW}$ is high. Clock signal $\phi_1$ also goes high at time t1 while clock signal $\phi_2$ remains low. CSP emulates inductor current $I_L$ and attains a peak value at time t2. Since clock signal $\phi_1$ is high, VC1 tracks CSP. CSN' and VC2 remain low at a previously sampled value of CSP stored on capacitor 508. At time t2, PU and PWM go low and PD and /PWM go high. Responsively, load current $I_L$ decreases to a minimum value at time t3. CSP again emulates inductor current $I_L$ and attains a minimum value at time t3. Since clock signal $\phi_1$ is high until time t3, VC1 tracks CSP. At time t3, clock signals $\phi_1$ and $\phi_2$ go low and high, respectively. The low level of $\phi_1$ stores a minimum value of CSP on capacitor 506 and disconnects capacitor 508 from BUF2. The high level of $\phi_2$ connects capacitor 506 to BUF2 and stores a new minimum value of CSP (VC2) on capacitor 508.

At time t3, signal $V_{SW}$ goes high again in response to control signal PU and corresponding signal PWM. Inductor current $I_L$ increases to a peak value at time t4 while $V_{SW}$ is high. Clock signal $\phi_2$ goes high at time t3 while clock signal $\phi_1$ remains low. CSP emulates inductor current $I_L$ and attains a peak value at time t4. Since clock signal $\phi_2$ is high, VC2 tracks CSP. CSN' and VC1 remain low at a previously sampled value of CSP stored on capacitor 506. At time t4, PU and PWM go low and PD and /PWM go high. Responsively, load current $I_L$ decreases to a minimum value at time t5. CSP again emulates inductor current $I_L$ and attains a minimum value at time t5. Since clock signal $\phi_2$ is high until time t5, VC2 tracks CSP. At time t5, clock signals $\phi_1$ and $\phi_2$ go high and low, respectively. The low level of $\phi_2$ stores a new minimum value of CSP (VC2) on capacitor 508 and disconnects capacitor 506 from BUF2. The high level of $\phi_1$ connects capacitor 508 to BUF2 and stores a new minimum value of CSP (VC1) on capacitor 506. The foregoing sequence continues so that one of transistor 402 or 404 is on and the other is off.

Referring next FIG. 5D, discontinuous current mode (DCM) of the circuits of FIGS. 5A and 5B will be described in detail. At time t1, signal $V_{SW}$ (FIG. 4) goes high in response to control signal PU and corresponding signal PWM. Inductor current $I_L$ increases to a peak value at time t2 while $V_{SW}$ is high. Clock signal $\phi_1$ also goes high at time t1 while clock signals $\phi_2$ and $\phi_3$ remain low. CSP emulates inductor current $I_L$ and attains a peak value at time t2. Since clock signal $\phi_1$ is high, VC1 tracks CSP. CSN' and VC2 remain low at a previously sampled value of CSP stored on capacitor 508. At time t2, PU and PWM go low and PD and /PWM go high. Responsively, load current $I_L$ decreases to a minimum value at time t3. CSP again emulates inductor current $I_L$ and attains a minimum value at time t3. Since clock signal $\phi_1$ is high, VC1 tracks CSP. At time t3, PD and /PWM go low and PU and PWM remain low. Clock signals $\phi_1$ and $\phi_2$ remain high and low, respectively. The low level of PU and PD at the input terminals of NOR gate 524 produces a high level output signal that is buffered by the delay inverter (526 and 528) and inverter 530 to produce a high level of clock signal $\phi_3$. From time t3 until time t4, inductor current remains near zero and $V_{SW}$ is approximately equal to $V_{OUT}$. Clock signal $\phi_3$ remains high and connects the output of BUF1 to the input of BUF2 via resistor 512. Between t3 and t4, therefore, the present value of CSP replaces the previously sampled value (VC2) on capacitor 508. Responsively, BUF2 produces CSN' as the present value of CSP. This advantageously avoids leakage of a stored CSP sample on capacitor 508 and maintains CSN' equal to CSP for any time period from t3 to t4.

At time t4, signal $V_{SW}$ goes high again in response to control signal PU and corresponding signal PWM. The high level of PU drives clock signal $\phi_3$ low to disconnect the output of BUF1 from the input of BUF2. Inductor current $I_L$ increases to a peak value at time t5 while $V_{SW}$ is high. Clock signal $\phi_2$ goes high at time t4 and clock signal $\phi_1$ goes low. CSP emulates inductor current $I_L$ and attains a peak value at time t5. Since clock signal $\phi_2$ is high, VC2 tracks CSP. CSN' and VC1 remain low at a previously sampled value of CSP stored on capacitor 506. At time t5, PU and PWM go low and PD and /PWM go high. Responsively, load current $I_L$ decreases to a minimum value at time t6. CSP again emulates inductor current $I_L$ and attains a minimum value at time t6. Since clock signal $\phi_2$ is high until time t6, VC2 tracks CSP. The foregoing sequence may continue in DCM or transition to CCM in response to varying load conditions.

Figure 6:
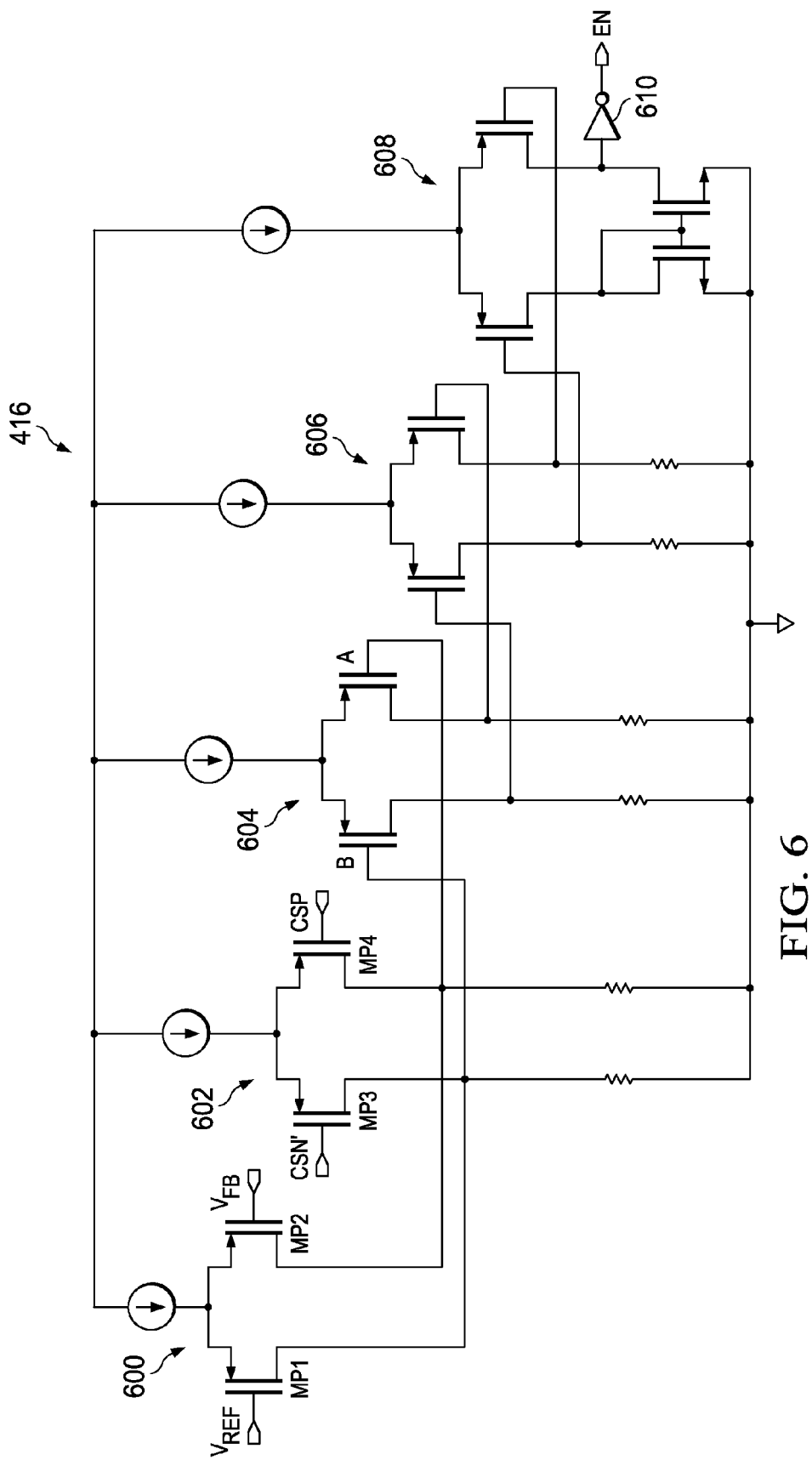
FIG. 6 is a schematic diagram of the 4-input comparator circuit of FIG. 4.

Referring now to FIG. 6, the 4-input comparator circuit 416 of FIG. 4 will be described in detail. In a preferred embodiment of the present invention, the 4-input comparator circuit includes five comparators 600-608. Comparator 600 compares reference voltage $V_{REF}$ to feedback voltage $V_{FB}$. Comparator 602 compares CSN' to CSP. As previously discussed, comparator 600 has a gain factor α greater than the gain of comparator 602. This gain factor is achieved by increasing the conductivity of transistors MP1 and MP2 with respect to transistors MP3 and MP4. Series connected comparators 604 and 606 amplify the combined difference voltage developed by comparators 600 and 602. Comparator 608 further amplifies the difference voltage from comparator 606 and applies a single output signal to inverter 610. Inverter 610 buffers the single output and produces enable signal EN, which is applied to PWM control circuit 400.

In operation, enable signal EN goes high when the common drain terminal (A) of transistors MP2 and MP4 is positive with respect to the common drain terminal (B) of transistors MP1 and MP3. This condition may occur when feedback voltage $V_{FB}$ is less than reference voltage $V_{REF}$ or when current sense signal CSP is less than current sense signal CSN'. A low-to-high transition of enable signal EN initiates a new on-time pulse in the PWM control circuit of FIG. 7 as will be explained in detail.

Figure 7:
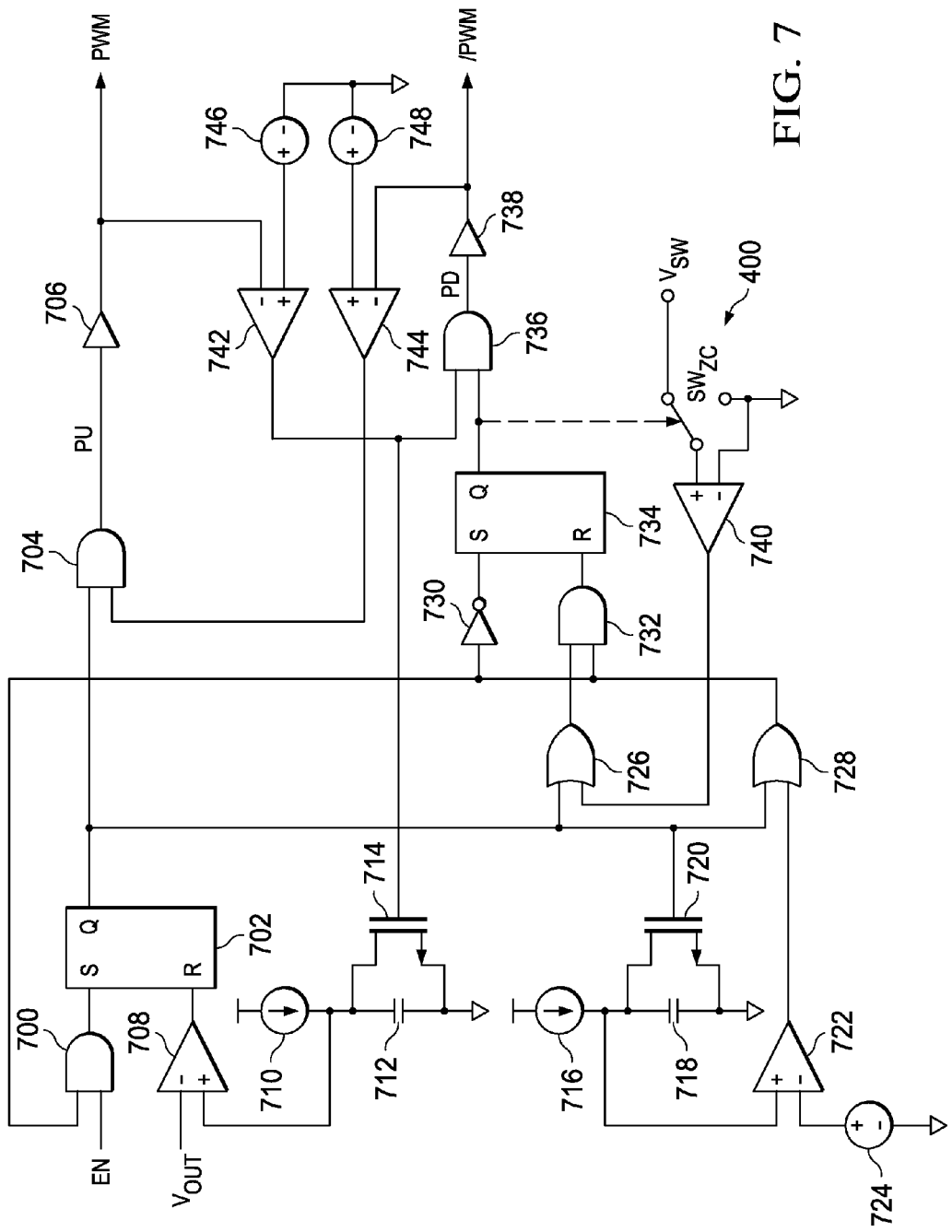
FIG. 7 is a schematic diagram of the PWM control circuit of FIG. 4.

Referring to FIG. 7, there is a simplified schematic diagram of the PWM control circuit of FIG. 4. The PWM control circuit includes four major parts that will be discussed separately as well as control logic. First, the on-time timer section includes comparator 708, current source 710, capacitor 712, and n-channel transistor 714. N-channel transistor 714 initially discharges capacitor 712 while current source 710 is off. At the beginning of an on-time pulse, n-channel transistor 714 is turned off and current source 710 is turned on. Duration of the on-time pulse is determined by the time required for current source 710 to charge capacitor 712. Comparator 708 compares the voltage on capacitor 712 with output voltage $V_{OUT}$. When the voltage on capacitor 712 exceeds output voltage $V_{OUT}$, comparator 708 produces a high level output signal at the reset terminal of SR flip flop 702. This resets SR flip flop 702 and produces a low output signal at the Q terminal, thereby terminating the on-time pulse.

Second, the off-time timer section includes comparator 722, reference voltage source 724, current source 716, capacitor 718, and n-channel transistor 720. N-channel transistor 720 initially discharges capacitor 718 while current source 716 is off. At the beginning of an off-time pulse, n-channel transistor 720 is turned off and current source 716 is turned on. Duration of the off-time pulse is determined by the time required for current source 716 to charge capacitor 718. Comparator 722 compares the voltage on capacitor 718 with reference voltage source 724. When the voltage on capacitor 718 exceeds reference voltage source 724, comparator 722 produces a high level output signal at one input terminal of OR gate 728. The other input of OR gate 728 is still low as determined by the Q output of SR flip flop 702 in the previous on-time period. The high level output from OR gate 728 is applied to one input of AND gate 700. However, the next on-time pulse will not begin until enable signal EN goes high. The high level output from OR gate 728 is applied to inverter 730 to drive the S terminal of SR flip flop 734 low. The high level output from OR gate 728 is also applied to AND gate 732 to drive the R terminal of SR flip flop 734 high. The high level of the reset terminal of SR flip flop 734 produces a low output signal at the Q terminal, thereby terminating the off-time pulse.

Third, the zero crossing section includes comparator 740 and switch $SW_{ZC}$. The Q output of SR flip flop 734 is high during an off-time pulse, thereby producing a high level of PD and /PWM so that n-channel transistor 404 (FIG. 4) is on. The high level of the Q output of SR flip flop 734 activates switch $SW_{ZC}$ so that comparator 740 compares voltage $V_{SW}$ to reference voltage $V_{SS}$ or ground. If voltage $V_{SW}$ goes negative with respect to ground during the off-time period, comparator 740 produces a low level output at an input of OR gate 726. Together with the low level from the Q terminal of SR flip flop 702, OR gate 726 produces a low level at an input of AND gate 732 to produce a low level at the R input of SR flip flop 734. The low level of the R input of SR flip flop 734 prevents termination of the off-time pulse even if the off-time timer has expired. Thus, n-channel transistor 404 remains on while voltage $V_{SW}$ is negative with respect to ground to prevent any significant undershoot that might induce minority carrier injection.

Fourth, the cross-conduction control section includes AND gates 704 and 736, buffers 706 and 738, comparators 742 and 744, and reference voltage sources 746 and 748. The cross-conduction control section assures that n-channel transistors 402 and 404 are never on at the same time. During an on-time period, for example, AND gate 704 produces a high level signal PU. Buffer 706 buffers this signal to provide a high level of PWM at the gate of n-channel transistor 402 as well as at one input of comparator 742. While the level of PWM exceeds reference voltage 746, comparator 742 produces a low level output that turns off n-channel transistor 714 and produces a low level signal PD and buffered signal /PWM. Thus, PD and /PWM remain low while PWM is greater than reference voltage 746. Likewise, during an off-time period AND gate 736 produces a high level signal PD. Buffer 738 buffers this signal to provide a high level of /PWM at the gate of n-channel transistor 404 as well as at one input of comparator 744. While the level of /PWM exceeds reference voltage 748, comparator 744 produces a low level output which, in turn, produces a low level signal PU and buffered signal PWM. Thus, PU and PWM remain low while /PWM is greater than reference voltage 748.

Still further, while numerous examples have thus been provided, one skilled in the art should recognize that various modifications, substitutions, or alterations may be made to the described embodiments while still falling within the inventive scope as defined by the following claims. For example, although the previous on-time and off-time circuits disclose current ramps having a positive slope, alternative embodiments of the present invention may also employ current ramps having a negative slope or a combination of positive and negative slopes. Moreover, although embodiments of the present invention disclose a positive power supply voltage, other embodiments of the present invention may also be directed to a negative power supply voltage. Other combinations will be readily apparent to one of ordinary skill in the art having access to the instant specification.

What is claimed is:

1. A voltage converter, comprising:
   a control circuit coupled to receive an enable signal, the control circuit producing a first control signal to activate a switch to provide a load current to an output terminal in response to the enable signal;
   an inductor in series with an output of the voltage converter;
   a second order filter in parallel with the inductor, the second order filter comprising a plurality of first-order filters, each of first-order filters having a capacitor coupled to the output of the voltage converter;
   a sample and hold circuit coupled to a node of one of the plurality of first order filters to receive a third control signal at an input thereof to emulate the load current and generate a fourth control signal at an output of the sample and hold circuit as a new value of the third control signal; and
   a comparator circuit arranged to compare the third and fourth control signals and produce the enable signal in response to a result of the comparison.

2. A voltage converter as in claim 1, comprising:
   a load capacitor coupled to the output terminal; and
   the inductor arranged to conduct the load current to the load capacitor in response to the first control signal.

3. A voltage converter as in claim 1, wherein the control circuit produces a second control signal that is complementary to the first control signal.

4. A voltage converter as in claim 1, wherein the control circuit produces a second control signal having a low level while the first control signal has a high level, and wherein the third and fourth control signals are equal when the first and second control signals both have a low level.

5. A voltage converter as in claim 1, wherein the value of the fourth control signal is a sample of a minimum value of the third control signal.

6. A voltage converter as in claim 1, wherein the third control signal alternately has minimum and maximum values, and wherein the fourth control signal is a successive sample of each minimum value of the third control signal.

7. A voltage converter as in claim 1, comprising:
   a current source;
   a capacitor coupled to receive a current from the current source; and
   a comparator having a first input terminal coupled to the capacitor and having a second input terminal coupled to the output terminal, wherein a duration of the first control signal is determined by an output signal from the comparator.

8. A power supply, comprising:
   a first output transistor having a first control terminal and having a current path coupled between a supply voltage and an output terminal;
   a second output transistor having a second control terminal and having a current path coupled between the output terminal and a reference terminal;
   a control circuit coupled to receive an enable signal, the control circuit producing a first control signal at the first control terminal in response to the enable signal, and producing a second control signal at the second control terminal;
   a sample and hold circuit arranged to produce a third control signal at an input thereof to emulate a load current and generate a fourth control signal at an output of the sample and hold circuit as a new value of the third control signal; and
   a comparator circuit arranged to compare the third and fourth control signals and produce the enable signal in response to a result of the comparison.

9. A power supply as in claim 8, comprising:
   a load capacitor coupled to the output terminal; and
   an inductor arranged to conduct the load current to the load capacitor in response to the first control signal.

10. A power supply as in claim 8, wherein the first and second control signals are complementary in a continuous mode of operation.

11. A power supply as in claim 8, wherein the first and second control signals are both low at a first time in a discontinuous mode of operation.

12. A power supply as in claim 8, wherein the value of the fourth control signal is a sample of a minimum value of the third control signal.

13. A power supply as in claim 8, wherein the value of the fourth control signal is a sample of a maximum value of the third control signal.

14. A power supply as in claim 8, wherein the third control signal alternately has minimum and maximum values, and wherein the fourth control signal is a successive sample of each minimum or maximum value of the third control signal.

15. A method of regulating an output voltage, comprising:
   producing an on-time signal having a first duration in response to an enable signal;

producing a load current in response to the on-time signal;
producing a first voltage signal emulating the load current in a second order filter;
producing a second voltage signal having a sampled value of the first voltage signal at a valley thereof and holding the sampled signal during the next cycle;
filtering the second voltage signal;
comparing the first and second voltage signals; and
producing the enable signal in response to a result of the step of comparing.

16. A method as in claim 15, comprising:
producing an off-time signal having a second duration after the step of producing the on-time signal.

17. A method as in claim 15, wherein the sampled value is a minimum value of the first voltage signal.

18. A method as in claim 15, wherein the first voltage signal comprises a sequence of alternating minimum and maximum values, and wherein the second voltage signal is a sample of each successive minimum value of the first voltage signal.

19. A method as in claim 15, wherein the first voltage signal comprises a sequence of alternating minimum and maximum values, and wherein the second voltage signal is a sample of each successive maximum value of the first voltage signal.

20. A method as in claim 15, wherein the step of comparing comprises comparing a feedback signal from the output voltage to a reference voltage.

* * * * *